United States Patent
Pan et al.

(10) Patent No.: US 11,962,029 B2
(45) Date of Patent: Apr. 16, 2024

(54) BATTERY PACK, ASSEMBLY PROCESS OF BATTERY PACK AND VEHICLE

(71) Applicant: CALB Co., Ltd., Jiangsu (CN)

(72) Inventors: Fangfang Pan, Changzhou (CN);
Fanming Kong, Changzhou (CN);
Ruisheng Tian, Changzhou (CN);
Xincheng Cao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 71 days.

(21) Appl. No.: 17/389,265

(22) Filed: Jul. 29, 2021

(65) Prior Publication Data

US 2022/0367956 A1    Nov. 17, 2022

(30) Foreign Application Priority Data

May 14, 2021 (CN) .......................... 202110529576.7

(51) Int. Cl.
*H01M 50/289* (2021.01)
*B60L 50/64* (2019.01)
(Continued)

(52) U.S. Cl.
CPC ....... *H01M 50/244* (2021.01); *H01M 50/249* (2021.01); *H01M 50/289* (2021.01);
(Continued)

(58) Field of Classification Search
CPC ............. H01M 50/244; H01M 50/249; H01M 50/289; H01M 50/325; H01M 2220/20; B60L 50/64
See application file for complete search history.

(56) References Cited

U.S. PATENT DOCUMENTS 9,112,207 B2 *   8/2015   Park ................... H01M 10/6561
9,660,231 B2 *   5/2017   Yoon ................... H01M 50/209
(Continued)

FOREIGN PATENT DOCUMENTS

DE   102020200006   7/2021
EP       2615663    7/2013
(Continued)

OTHER PUBLICATIONS

Rajasekhar Mv et al., "High Voltage Battery Pack Design for Hybrid Electric Vehicles", 2015 IEEE International Transportation Electrification Conference, Aug. 2015, pp. 1-7.
(Continued)

*Primary Examiner* — Lawrence Averick
(74) *Attorney, Agent, or Firm* — JCIP GLOBAL INC.

(57) ABSTRACT

The disclosure relates to a technical field of batteries, and in particular, relates to a battery pack, an assembly process thereof, and a vehicle. The battery pack includes a battery compartment configured for accommodating a plurality of batteries, and a side wall of the battery compartment is a blocking beam. The assembly process includes the following: arranging at least two adjacent side walls of the battery compartment excluding the blocking beam at a first predetermined position to form an accommodating space; arranging the batteries in the accommodating space; and arranging the blocking beam at a second predetermined position to limit the batteries.

15 Claims, 3 Drawing Sheets

(51) Int. Cl.
 *H01M 50/244* (2021.01)
 *H01M 50/249* (2021.01)
 *H01M 50/325* (2021.01)

(52) U.S. Cl.
 CPC ........... *H01M 50/325* (2021.01); *B60L 50/64* (2019.02); *H01M 2220/20* (2013.01)

(56) References Cited

U.S. PATENT DOCUMENTS

| | | | |
|---|---|---|---|
| 9,716,256 B2 * | 7/2017 | Noh | H01M 50/103 |
| 10,347,880 B2 * | 7/2019 | Kim | H01M 50/211 |
| 11,114,726 B2 * | 9/2021 | Gu | H01M 50/264 |
| 11,335,982 B2 * | 5/2022 | Shen | H01M 50/593 |
| 2013/0202926 A1 * | 8/2013 | Yoon | H01M 50/264 |
| | | | 429/82 |
| 2014/0120391 A1 * | 5/2014 | Park | H01M 50/271 |
| | | | 429/72 |
| 2015/0064542 A1 * | 3/2015 | Noh | H01M 50/291 |
| | | | 429/156 |
| 2018/0114957 A1 * | 4/2018 | Kim | H01M 10/6555 |
| 2021/0159576 A1 * | 5/2021 | Shen | H01M 50/209 |
| 2021/0167458 A1 * | 6/2021 | Gu | H01M 50/209 |

FOREIGN PATENT DOCUMENTS

| | | | |
|---|---|---|---|
| EP | 2843725 | 3/2015 | |
| EP | 2843725 A1 * | 3/2015 | ........ H01M 10/0413 |
| EP | 2843725 B1 * | 9/2019 | ........ H01M 10/0413 |
| EP | 3648419 A1 * | 5/2020 | ............. H04L 45/04 |
| EP | 3648419 B1 * | 7/2021 | ............. H04L 45/04 |

OTHER PUBLICATIONS

"Search Report of Europe Counterpart Application", dated Jan. 26, 2022, pp. 1-9.

* cited by examiner

BATTERY PACK, ASSEMBLY PROCESS OF BATTERY PACK AND VEHICLE

CROSS-REFERENCE TO RELATED APPLICATION

This application claims the priority of China patent application serial no. 202110529576.7, filed on May 14, 2021. The entirety of the above-mentioned patent application is hereby incorporated by reference herein and made a part of this specification.

BACKGROUND

Technical Field

The disclosure relates to a technical field of batteries, and in particular, relates to a battery pack, an assembly process of the battery pack, and a vehicle.

Description of Related Art

With the development and progress of technology, the application of electric vehicles grows. At present, due to the limitation of battery energy density and other reasons, the battery life of electric vehicles is relatively short. One solution is to arrange as many batteries as possible in the accommodating compartments holding the batteries. However, it is difficult to install as many batteries as possible in limited space provided by the battery compartment.

Note that the above-mentioned information disclosed in the BACKGROUND section is only used to strengthen the understanding of the background of the disclosure, and therefore it may include information that does not constitute the prior art known to a person having ordinary skill in the art.

SUMMARY

According to the first aspect of the disclosure, an assembly process of a battery pack is provided. The battery pack includes a battery compartment configured for accommodating a plurality of batteries, and a side wall of the battery compartment is a blocking beam. The assembly process includes the following steps.

At least two adjacent side walls of the battery compartment excluding the blocking beam are arranged at a first predetermined position to form an accommodating space.

The batteries are arranged in the accommodating space.

The blocking beam is arranged at a second predetermined position to limit the batteries.

In the assembly process of the battery pack provided by the embodiments of the disclosure, when the batteries are assembled, at least two adjacent side walls of the battery compartment excluding the blocking beam are arranged at the first predetermined position to form the accommodating space. The batteries are then disposed in the accommodating space, and the blocking beam is disposed at the second predetermined position to limit the batteries.

According to the second aspect of the disclosure, a battery pack is provided, and the battery pack is made through the aforementioned assembly process.

In the battery pack provided by the embodiments of the disclosure, when the batteries are assembled, at least two adjacent side walls of the battery compartment excluding the blocking beam are arranged at the first predetermined position to form the accommodating space. The batteries are then disposed in the accommodating space, and the blocking beam is disposed at the second predetermined position to limit the batteries.

According to the third aspect of the disclosure, a vehicle is provided, and the vehicle includes the aforementioned battery pack.

The vehicle provided by the embodiments of the disclosure includes the battery pack. In the battery pack, when the batteries are assembled, at least two adjacent side walls of the battery compartment excluding the blocking beam are arranged at the first predetermined position to form the accommodating space. The batteries are then disposed in the accommodating space, and the blocking beam is disposed at the second predetermined position to limit the batteries.

It should be understood that the above general description and the following detailed description are only exemplary and explanatory and may not be used to limit the disclosure.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The disclosure provides a battery pack, an assembly process of the battery pack, and a vehicle capable of improving the convenience of battery assembly at least to a certain extent.

Figure 1:
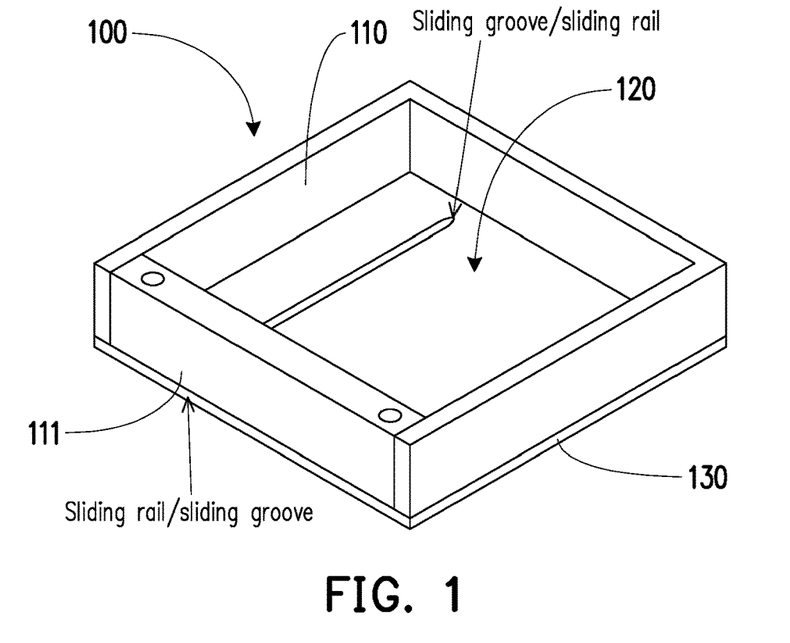
FIG. 1 is a schematic view of a structure of a first battery pack according to an embodiment of the disclosure.
Figure 2:
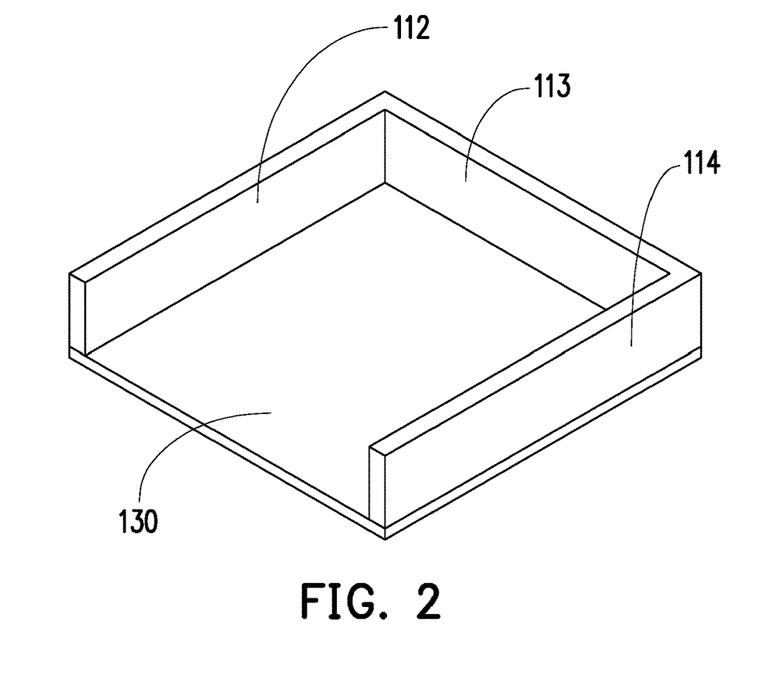
FIG. 2 is a local schematic view of a battery pack according to an embodiment of the disclosure.

A battery pack is provided by the embodiments of the disclosure. As shown in FIG. 1 and FIG. 2, the battery pack includes a battery compartment 100 and a battery module, and the battery compartment 100 includes a bottom plate 130 and a plurality of side walls 110. The side walls 110 are disposed on the bottom plate 130, and the side walls 110 and the bottom plate 130 form the battery compartment 100. The battery module is disposed in the battery compartment 100 and includes a plurality of batteries, and the batteries are arranged in sequence. One side wall 110 of the battery compartment 100 is a blocking beam 111, and the blocking beam 111 is the side wall 110 of the battery compartment 100 in an arranging direction of the batteries.

Components of the battery pack provided by the embodiments of the disclosure are described in detail as follows.

The battery compartment 100 includes the bottom plate 130 and the side walls 110. The side walls 110 and the bottom plate 130 are connected, and the side walls 110 and the bottom plate 130 form an accommodating space 120 of the battery compartment 100. The battery module is disposed in the accommodating space 120. The side wall 110 acting as the blocking beam 111 among the side walls 110 and the rest of the side walls 110 are split-type lenses. The side walls 110 excluding the blocking beam 111 may exhibit separate structures or an integral structure.

The bottom plate 130 may be a flat plate structure or a near-flat plate structure. For instance, the bottom plate 130 may be a stainless-steel plate or an aluminum alloy plate and the like. The bottom plate 130 is provided with an accommodating area, and the accommodating area is configured to hold a plurality of batteries. Orthographic projections of the batteries on the bottom plate 130 are located in the accommodating area, and the batteries may also be directly disposed in the accommodating area. Alternatively, other devices, such as a cooling device, may also be disposed between the batteries and the bottom plate 130, which is not specifically limited by the embodiments of the disclosure.

Figure 3:
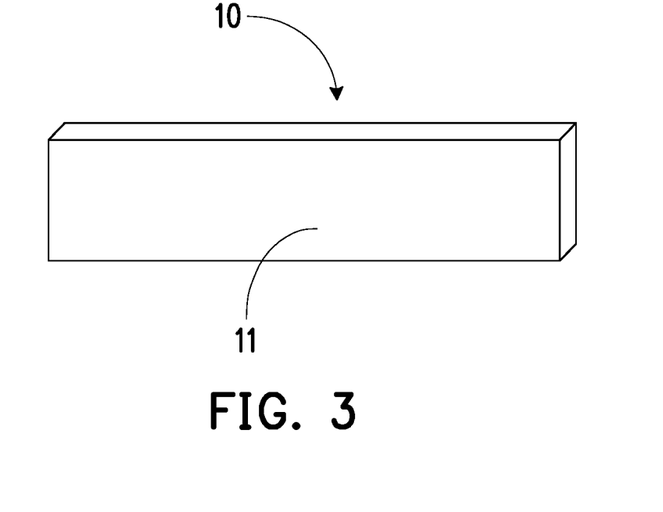
FIG. 3 is a schematic view of a first battery according to an embodiment of the disclosure.

The side walls 110 are connected in sequence to form a frame on the bottom plate 130. The frame surrounds the accommodating area and forms the accommodating space 120 configured for holding the batteries. The batteries are arranged in the accommodating space 120 in sequence, and the blocking beam 111 is located in the arranging direction of the batteries. Large surfaces of adjacent batteries among the batteries face each other. Glue may be applied to the large surfaces of two adjacent batteries to form a glue connecting layer between the large surfaces of the adjacent batteries. The large surfaces of a battery refer to the two surfaces of the cuboid battery with the largest area in the cuboid battery. As shown in FIG. 3, a battery 10 is provided in this figure, and a surface 11 and a surface opposite to the surface 11 of the battery 10 are the large surfaces of the battery 10.

Each side wall 110 is connected to the bottom plate 130, and the side wall 110 and the bottom plate 130 may be connected by welding. Herein, in order to improve strength of connection between the side wall 110 and the bottom plate 130, a glue container may be disposed on one side of the side wall 110 close to the bottom plate 130. The glue container is provided with connecting glue, and the side wall 110 and the bottom plate 130 are connected through the connecting glue. For instance, the side wall 110 is provided with a first welding area and a second welding area. The first welding area is disposed on a bottom surface of the side wall 110, and the first welding area is close to an outer edge of the bottom surface of the side wall 110. The second welding area is disposed on the bottom surface of the side wall 110, and the second welding area is close to an inner edge of the bottom surface of the side wall 110. The glue container is disposed between the first welding area and the second welding area. The first welding area and the second welding area are configured to be welded and connected to the bottom plate 130, and the bottom surface of the side wall 110 is a surface of the side wall 110 close to the bottom plate 130. Certainly, the side wall 110 and the bottom plate 130 may also form an integral structure and the like, and the embodiments of the disclosure are not limited thereto.

When each of the batteries is a cuboid structure, the accommodating space 120 formed by the side walls 110 and the bottom plate 130 may also be a cuboid chamber, and the batteries are arranged inside the cuboid chamber in sequence. When the batteries are disposed in the accommodating space 120, a certain pressure is provided among the batteries, and such pressure may facilitate reaction of the batteries themselves. Therefore, when the blocking beam 111 is installed, a proper compression of the batteries may be applied to the blocking beam 111 to generate a preload force, which may facilitate reaction of the batteries themselves.

Based on the above, the battery pack may include a first side wall 112, a second side wall 113, a third side wall 114, and a fourth side wall (the blocking beam 111). The first side wall 112 is disposed on the bottom plate 130 in a first direction, and the second side wall 113 is disposed on the bottom plate 130 in a second direction. One end of the first side wall 112 is connected to one end of the second side wall 113, and the first direction is perpendicular to the second direction. The third side wall 114 is disposed in the first direction, and one end of the third side wall 114 is connected to one end of the second side wall 113 away from the first side wall 112. The fourth side wall is connected to the first side wall 112 and one end of the third side wall 114 away from the second side wall 113. The fourth side wall is the blocking beam 111.

Herein, a length of the first side wall 112 and a length of the third side wall 114 may be the same. Each of the first side wall 112 and the third side wall 114 is connected to one end of the second side wall 113. One end of the first side wall 112 away from the second side wall 113 and the end of the third side wall 114 away from the second side wall 113 are flush. The blocking beam 111 is mounted between the end of the first side wall 112 away from the second side wall 113 and the end of the third side wall 114 away from the second side wall 113. The first side wall 112, the second side wall 113, and the third side wall 114 may be integrally formed. For instance, the first side wall 112, the second side wall 113, and the third side wall 114 may be formed by machining, casting, or stamping and the like. Alternatively, the first side wall 112, the second side wall 113, and the third side wall 114 may be made separately and then connected together. For instance, the first side wall 112 and the second side wall 113 are connected by welding, and the second side wall 113 and the third side wall 114 are connected by welding. Alternatively, the first side wall 112 and the second side wall 113 are connected by riveting, and the second side wall 113 and the third side wall 114 are connected by riveting, which is not specifically limited by the disclosure.

The blocking beam 111 is opposite to the second side wall 113, and the blocking beam 111 may extend from the first side wall 112 to the third side wall 114. Alternatively, the blocking beam 111 does not contact the first side wall 112 or the third side wall 114, which is not specifically limited by the disclosure.

In a practical embodiment of the disclosure, one end of the blocking beam 111 contacts an inner side surface of the first side wall 112, and the other end of the blocking beam 111 contacts an inner side surface of the third side wall 114. The inner side surface of the first side wall 112 is a surface of the first side wall 112 close to the third side wall 114, and the inner side surface of the third side wall 114 is a surface of the third side wall 114 close to the first side wall 112. As the blocking beam 111 extends from the first side wall 112 to the third side wall 114, a contact surface between the blocking beam 111 and the batteries may be enlarged, and the batteries are thereby protected. Further, as the connecting glue is used to connect the blocking beam 111 and the batteries, a connecting surface may be enlarged, and the strength of connection may thereby be improved.

In another practical embodiment of the disclosure, the blocking beam 111 does not contact the first side wall 112 or the third side wall 114. For instance, one end of the blocking beam 111 does not contact the first side wall 112 or the third side wall 114, and the other end of the blocking beam 111 does not contact the third side wall 114. Alternatively, one end of the blocking beam 111 contacts the third side wall 114, and the other end of the blocking beam 111 does not contact the first side wall 112. Alternatively, the blocking beam 111 is neither connected to the first side wall 112 nor connected to the third side wall 114, which is not specifically limited by the disclosure.

When the batteries are installed in the battery compartment 100, the tooling is required to be used to push the blocking beam 111 to move, so as to apply the preload force to the batteries. During the process of pushing the blocking beam 111 by the tooling, in order to ensure that the blocking beam 111 is in a predetermined position after the blocking beam 111 moves, a guiding structure may be disposed on the battery compartment 100. The guiding structure guides the blocking beam 111 to move in a predetermined direction.

The battery compartment 100 is provided with a first guiding structure, and the blocking beam 111 is provided with a second guiding structure. The first guiding structure is matched with the second guiding structure to guide the blocking beam 111 to move in the arranging direction of the batteries.

For instance, a sliding groove may be disposed on the inner side surface of the first side wall 112 in the extending direction, a sliding groove may also be disposed on the inner side surface of the second side wall 113 in the extending direction, and sliding block protrusions are disposed at two ends of the blocking beam 111. The sliding block protrusions are matched with the sliding grooves, and in this way, the blocking beam 111 may move in the predetermined direction.

Alternatively, a sliding rail may be disposed on the inner side surface of the first side wall 112 in the extending direction, a sliding rail may also be disposed on the inner side surface of the second side wall 113 in the extending direction, and sliding grooves are disposed at two ends of the blocking beam 111. The sliding rails are matched with the sliding grooves, and in this way, the blocking beam 111 may move in the predetermined direction. Certainly, in practical applications, the sliding grooves or the sliding rails may be disposed on a top surface of the bottom plate 130, and corresponding sliding rails or sliding grooves may be disposed on a bottom surface of the blocking beam 111 herein.

Figure 4:
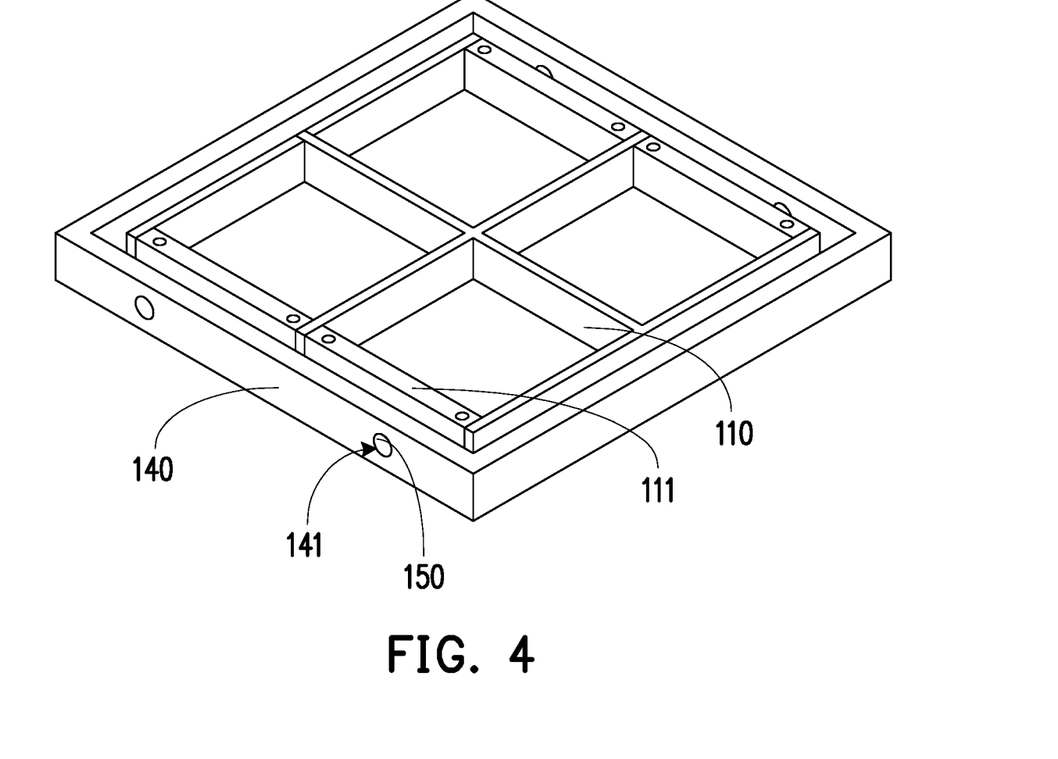
FIG. 4 is a schematic view of a structure of a second battery pack according to an embodiment of the disclosure.
Figure 5:
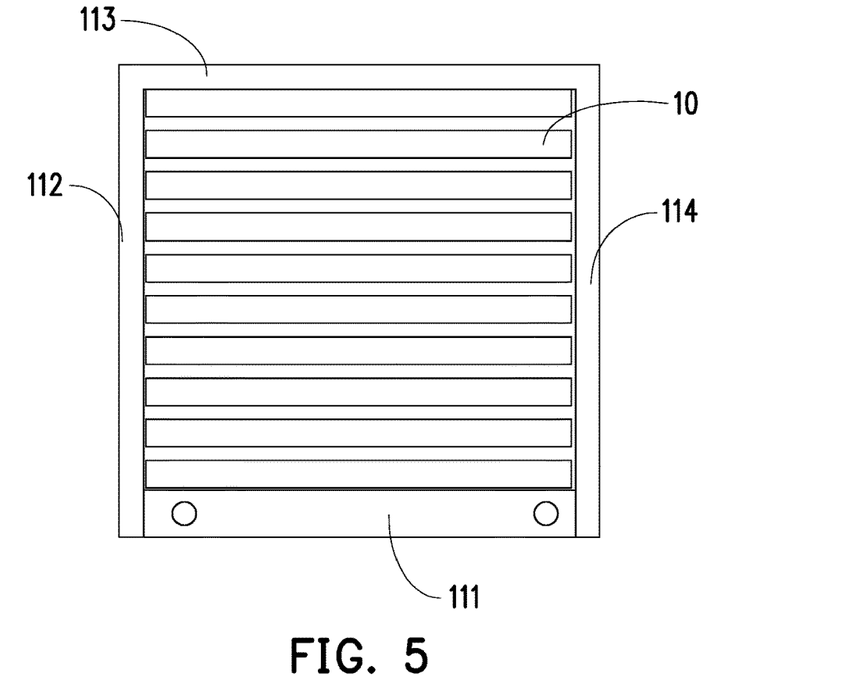
FIG. 5 is a schematic view of a structure of a third battery pack according to an embodiment of the disclosure.

In this embodiment, FIG. 4 is a schematic view of a structure of a second battery box according to an exemplary embodiment of the disclosure. As shown in FIG. 4, the battery pack provided by the embodiments of the disclosure may further include a border frame 140. The border frame 140 surrounds the side walls 110 of the battery compartment 100. Further, a first area of the border frame 140 is provided with an explosion-proof valve mounting hole 141, and the first area of the border frame 140 is an area where the border frame 140 and the blocking beam 111 are opposite to each other. The explosion-proof valve mounting hole 141 penetrates the border frame 140.

Herein, the border frame 140 may be connected to the bottom plate 130. For instance, the border frame 140 may be disposed on the top surface of the bottom plate 130, a bottom surface of the border frame 140 contacts the top surface of the bottom plate 130 and is connected to the top surface of the bottom plate 130 through welding. Alternatively, the border frame 140 may surround the bottom plate 130, and an inner side surface of the border frame 140 and a border edge of the border frame 140 are connected through welding, which is not specifically limited by the disclosure.

A predetermined distance is provided between the inner side surface of the border frame 140 and the opposite side wall 110 of the battery compartment 100. The border frame 140 is configured to act as a buffer when a collision occurs, and in this way, the batteries are prevented from exploding caused by a direct collision.

The border frame 140 may be a rectangular structure. The border frame 140 herein includes a first side, a second side, a third side, and a fourth side. The first side, the second side, the third side, and the fourth side are connected end to end in sequence to form the border frame 140.

Herein, one border frame 140 may be provided with a plurality of the battery compartments 100, and the battery compartments 100 are arranged in an array. The blocking beam 111 of each of the battery compartments 100 among the battery compartments 100 faces the border frame 140. That is, the blocking beams 111 of the battery compartments 100 face outwards. When the border frame 140 is provided with plural battery compartments 100, the border frame 140 is correspondingly provided with a plurality of the explosion-proof valve mounting holes 141. The explosion-proof valve mounting holes 141 on the border frame 140 may be round holes, elliptical holes, or square holes and the like, which is not specifically limited by the disclosure.

The border frame 140 may be integrally formed, that is, the first side, the second side, the third side, and the fourth side are integrally formed. For instance, the first side, the second side, the third side, and the fourth side may be integrally formed by machining, casting, stamping, etc. Alternatively, the border frame 140 may be formed separately and then connected, that is, the first side, the second side, the third side, and the fourth side are formed separately. For instance, the first side, the second side, the third side, and the fourth side may be connected by welding, riveting, or bolting and the like, which is not specifically limited by the embodiments of the disclosure.

Since the explosion-proof valve mounting holes 141 are disposed on the border frame 140, when the batteries are mounted, the tooling may penetrate the border frame 140 to push the blocking beams 111. The preload force may thus be applied to the plural batteries, and the border frame 140 is prevented from interfering with the tooling, which may cause the tooling to be unable to push the blocking beam 111.

In this embodiment, the battery pack further includes an explosion-proof valve 150, and the explosion-proof valve 150 is disposed in the explosion-proof valve mounting hole 141. The explosion-proof valve 150 is configured to relieve a pressure of the battery pack. When a battery explodes or leaks, the pressure in the battery pack may increase significantly, and the pressure in a box body may be released through the explosion-proof valve 150.

In the embodiments of the disclosure, on the one hand, arrangement of the explosion-proof valve mounting hole 141 on the border frame 140 may allow the tooling to apply the preload force to the batteries during mounting. On the other hand, the explosion-proof valve mounting hole 141 may be provided with the explosion-proof valve 150 when assembly is completed. It thus can be seen that one hole may be used differently, so that the border frame 140 is not required to be provided with multiple holes, strength of the border frame 140 is thereby enhanced, and less processing is needed.

The blocking beam 111 may be connected to other side walls 110, the blocking beam 111 may be connected to the bottom plate 130, or the blocking beam 111 may be connected to both the bottom plate 130 and the side walls 110. The blocking beam 111 is connected to the bottom plate 130 and the side walls 110 through bolts. Threaded holes may be disposed on the bottom plate 130 and a predetermined position of the side walls 110. When the tooling pushes the blocking beam 111 to the predetermined position, a threaded hole on the blocking beam 111 and the threaded holes on the bottom plate 130 and the side walls 110 are flush. Bolts may be used to extend into the threaded holes on the blocking beam 111, the bottom plate 130, and the side walls 110, and connection is thereby achieved.

Glue containers are disposed on portions of the bottom plate 130 and the side walls 110 in contact with the blocking beam 111. Connecting glue layers are disposed in the glue containers, and the connecting glue layers are configured to connect the blocking beam 111 and the bottom plate 130 and the side walls 110, Since the glue containers are disposed on contact surfaces between the blocking beam 111 and the bottom plate 130 and the side walls 110, filling the glue containers with the connecting glue layers may improve the strength of connection and sealing performance between the blocking beam 111 and the bottom plate 130 and the side walls 110.

Herein, the glue containers may be rectangular grooves or triangular grooves, which is not specifically limited by the disclosure. A glue container may be disposed on the bottom surface of the blocking beam 111. The glue container may penetrate the blocking beam 111 in a length direction, the glue container may not penetrate the blocking beam 111 in the length direction, or the glue container may penetrate the blocking beam 111 at one end in the length direction and may not penetrate the blocking beam 111 at the other end, which is not specifically limited by the disclosure.

Alternatively, glue containers may be disposed at two ends of the blocking beam 111, and the glue containers may penetrate the top surface and the bottom surface of the blocking beam 111. Alternatively, the glue containers may penetrate the top surface of the blocking beam 111 only. An opening penetrating a top portion of the blocking beam 111 may act as a glue injecting groove, and glue is injected to the glue containers through the opening on the top surface of the blocking beam 111.

Alternatively, glue containers may be disposed on both the bottom surface and two end surfaces of the blocking beam 111. The glue containers on multiple surfaces may communicate or may not communicate with one another. When the glue containers do not communicate with one another, the glue containers on the end surfaces of the blocking beam 111 may penetrate the top surface of the blocking beam 111. The opening penetrating the top portion of the blocking beam 111 may act as the glue injecting groove, and glue is injected to the glue containers through the opening on the top surface of the blocking beam 111. When the glue containers communicate with one another, the glue containers on end portions of the blocking beam 111 may penetrate the top surface of the blocking beam 111 or may not penetrate the top surface of the blocking beam 111, and glue may be injected through other methods. As an example, glue may be injected through glue injecting holes communicating with the glue containers on the blocking beam 111.

The glue injecting holes are disposed on the blocking beam 111, and the glue injecting holes communicate with the glue containers, so that glue may be injected into the glue containers through the glue injecting holes. For instance, the glue injecting holes may extend from the top surface of the blocking beam 111 to the glue containers, or the glue injecting holes may extend from side surfaces of the blocking beam 111 to the glue containers, which is not particularly limited by the disclosure.

In the embodiments of the disclosure, the threaded holes and the glue injecting holes may be shared and connected. That is, the threaded holes and the glue containers disposed on the blocking beam 111 may communicate with each other, so that glue may be injected into the glue containers through the threaded holes. When plural threaded holes are provided on the blocking beam 111, part of the threaded holes may be selected to act as the glue injecting holes. For instance, the threaded hole located in a center position of the blocking beam 111 may act as the glue injecting hole.

By setting the threaded holes to communicate with the glue containers and sharing and treating the threaded holes connected to the bottom plate 130 or the frame as the glue injecting holes, fewer holes are required to be provided on the blocking beam 111, so that the strength of the blocking beam 111 is ensured.

In the embodiments of the disclosure, the battery box may further include a box cover. The box cover is disposed above the battery compartment 100, and the battery compartment 100 and the box cover form a closed space. The batteries are located in the closed space, and the closed space may protect the batteries. The box cover may be connected to the side walls 110. For instance, the box cover may be connected to the side walls 110 through welding or riveting and the like.

It may be understood that the box cover may also be connected to the border frame 140, and the box cover and the border frame 140 may be connected through welding, bolting, or riveting and the like. Herein, the explosion-proof valve 150 is required to be disposed on the border frame 140 when the box cover is connected to the border frame 140.

In the embodiments of the disclosure, the connecting glue layers are disposed between adjacent batteries among the batteries in the battery module. Through arrangement of the glue connecting layers, on the one hand, adjacent batteries may be connected so that stability of the batteries in a battery box body is improved, and on the other hand, multiple batteries may be compressed to provide a buffering force between adjacent batteries. When the batteries are charged, this buffering force may also act as the preload force to preload the batteries to facilitate reaction of the batteries.

When the battery module is disposed in the battery compartment 100, the multiple batteries in the battery pack are subjected to the pressure of the blocking beam 111 and the side walls 110, and a preload force is generated among the batteries. The preload force may ensure stability of battery connection on the one hand, and the preload force may also facilitate reaction of the batteries and charging and discharging of the batteries on the other hand.

In the embodiments of the disclosure, the batteries may be wound batteries or laminated batteries. Each of the batteries includes a housing and an electric cell, and the electric cell is disposed in the housing. The housing is provided with electrode posts, and the electrode posts are connected to electrode sheets on the electric cell. In a practical embodiment of the disclosure, when the battery module is disposed in the battery box, the housing of each of the batteries in the battery module directly contacts a structure in the box body. For instance, the batteries located on two ends of the battery module contact the side walls 110, and a bottom surface of the batteries in the battery module contacts the top surface of the bottom plate 130. As the housing of each of the batteries directly contacts the box body, a battery module housing and other devices are not required to be arranged in the box body, so more batteries may be added to the box body, and energy density of the battery pack is thereby increased.

Figure 6:
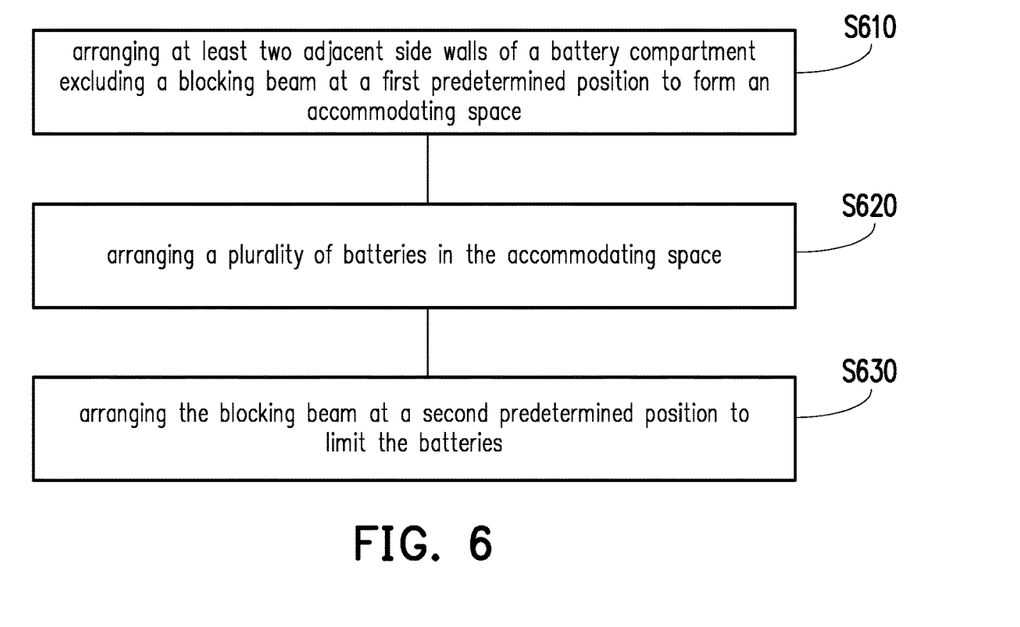
FIG. 6 is a flow chart of an assembly process of a battery pack according to an embodiment of the disclosure.

In the embodiments of the disclosure, an assembly process of a battery pack is also provided. The battery pack includes the battery compartment 100 configured to accommodate a plurality of batteries, and one side wall 110 of the battery compartment 100 is the blocking beam 111. As shown in FIG. 6, the assembly process of the battery pack may include the following steps.

In step S610, at least two adjacent side walls of a battery compartment excluding a blocking beam are arranged at a first predetermined position to form an accommodating space.

In step S620, a plurality of batteries is arranged in the accommodating space.

In step S630, the blocking beam is arranged at a second predetermined position to limit the batteries.

In the assembly process of the battery pack provided by the embodiments of the disclosure, when the batteries are assembled, at least two adjacent side walls 110 of the battery compartment 100 excluding the blocking beam 111 are arranged at the first predetermined position to form the accommodating space 120. The batteries are then disposed in the accommodating space 120, the blocking beam 111 is disposed at the second predetermined position to limit the batteries, and assembly convenience of the batteries is thereby improved.

Steps of the assembly process of the battery pack provided by the embodiments of the disclosure are described in detail as follows.

In step S610, at least two adjacent side walls 110 of the battery compartment 100 excluding the blocking beam 111 are arranged at the first predetermined position to form the accommodating space 120.

At least two adjacent side walls 110 of the battery compartment 100 excluding the blocking beam 111 are arranged at the first predetermined position. The two adjacent side walls 110 may position the battery pack in two directions. The positioning in the two directions may determine the position where the battery pack is to be placed.

The battery compartment 100 includes four side walls 110, and one of the side walls 110 is the blocking beam 111. During assembly, two adjacent side walls 110 excluding the blocking beam 111 may be placed at the first predetermined position, and the blocking beam 111 and the other side wall 110 may be assembled after the batteries are assembled. Alternatively, three side walls 110 excluding the blocking beam 111 may be placed at the first predetermined position, and the blocking beam 111 may be assembled after the batteries are assembled.

For instance, the first side wall 112 and the second side wall 113 may be disposed at the first predetermined position on the bottom plate 130, and the batteries may be positioned according to the first side wall 112 and the second side wall 113 herein. The third side wall 114 and the fourth side wall are mounted after the batteries are placed. Alternatively, the first side wall 112, the second side wall 113, and the third side wall 114 may be disposed at the first predetermined position of the bottom plate 130, and the blocking beam 111 is assembled after the batteries are assembled.

In step S620, a plurality of batteries is arranged in the accommodating space 120.

Before the batteries are disposed in the accommodating space 120, the batteries may be arranged in a direction perpendicular to the extending direction of the blocking beam 111. The plural batteries may be placed in the accommodating space 120 together herein. The batteries may be disposed in the accommodating space 120 through a fixture. Alternatively, when the batteries are placed in the accommodating space 120, glue may be applied to adjacent two batteries among the batteries to form the connecting glue layers. The batteries may be connected as a whole through the connecting glue to be placed in the frame.

Alternatively, the batteries may be placed in the accommodating space 120 piece by piece, the batteries are placed piece by piece, and the batteries are arranged in the direction perpendicular to the extending direction of the blocking beam 111.

A buffer layer may be disposed between adjacent batteries, and the buffer layer is configured to provide a buffering force to the batteries. When the buffer layer is provided between adjacent batteries, the buffer layer may be connected onto the batteries adjacent to the buffer layer through the connecting glue. As an example, the buffer layer may be provided between any two adjacent batteries, or the buffer layer may be provided between two adjacent groups of batteries where each group is formed by at least two batteries, which is not specifically limited.

Alternatively, during the installation of the battery pack, glue may be applied to the large surfaces of the batteries to form the connecting glue layer between adjacent batteries. Application of the connecting glue on the two large surfaces of each of the batteries allows the large surfaces of adjacent batteries to be connected through the connecting glue layer. Note that the batteries at both ends of the battery pack are only coated with the connecting glue on the inner side surfaces herein. The large surface of the battery close to a first end surface is not coated with the connecting glue in the battery close to the first end surface, and the large surface of the battery close to a second end surface is not coated with the connecting glue in the battery close to the second end surface.

Next, after the glue application is completed, the battery pack is placed on the accommodating space 120 on the battery compartment 100, and the blocking beam 111 is then placed in a corresponding position. In this way, the large surfaces of the batteries face the blocking beam 111, and an inner surface of the blocking beam 111 is parallel to the large surfaces of the batteries.

In step S630, the blocking beam 111 may be arranged at the second predetermined position to limit the batteries.

Herein, when the blocking beam 111 is placed at the second predetermined position, the two ends of the blocking beam 111 may contact the adjacent side walls 110, and the blocking beam 111 may abut against the batteries. The blocking beam 111 may thus be used to limit the batteries. Further, the connecting glue may be provided between the blocking beam 111 and the batteries. Since the blocking beam 111 is connected to the batteries, the blocking beam 111 may bear part of the gravity of the batteries as well as the impact force during movement.

After step S630 is performed, the assembly process of the battery pack provided by the embodiments of the disclosure may further includes the following steps. The blocking beam 111 may be connected to the side walls 110 of the battery compartment 100 adjacent to the blocking beam 111, and/or the blocking beam 111 is connected to the bottom plate 130 of the battery compartment 100.

That is, the blocking beam 111 may be connected to the adjacent side walls 110, the blocking beam 111 may be connected to the bottom plate 130, or the blocking beam 111 may be connected to both the bottom plate 130 and the side walls 110. The blocking beam 111 may be connected to the side walls 110 of the battery compartment 100 adjacent to the blocking beam 111 through one or more of gluing, bolting, and welding. The blocking beam 111 may be connected to the bottom plate 130 of the battery compartment 100 through one or more of gluing, bolting, and welding.

The border frame 140 surrounding the side walls 110 of the battery compartment 100 is provided outside the battery compartment 100. The explosion-proof valve mounting hole 141 is disposed at a corresponding position of the border frame 140 and the blocking beam 111. The batteries are arranged in the accommodating space 120. The step of arranging the blocking beam 111 at the second predetermined position to limit the batteries further includes the following. The tooling is extended into the explosion-proof valve mounting hole 141, and the blocking beam 111 is moved to the second predetermined position to limit the batteries and set the batteries to be disposed in the battery compartment 100.

In the case that the battery pack further includes the border frame 140, when the blocking beam 111 is pushed by the tooling, the border 140 may interfere with the tooling. In order to solve this problem, the tooling is extended into the border frame 140 through the explosion-proof valve mounting hole 141 on the border frame 140. The tooling penetrates the explosion-proof valve mounting hole 141 on the border frame 140 to push the blocking beam 111, which solves the problem that the border frame 140 interferes with the tooling. Further, the explosion-proof valve 150 may be mounted in the explosion-proof valve mounting hole 141, and in this way, the existing structure on the border frame 140 is fully used, and the process is saved.

The tooling extends into the explosion-proof valve mounting hole 141 on the border frame 140, and the tooling is used to push the blocking beam 111 to move and to move to the predetermined position. When the blocking beam 111 reaches the predetermined position, the threaded hole on the blocking beam 111 and the threaded holes on the side walls 110 and the bottom plate 130 are flush. After the threaded hole on the battery compartment 100 and the threaded holes on the blocking beam 111 are flush, the tooling still abuts against the blocking beam 111. The battery compartment 100 and the blocking beam 111 may be connected by bolts herein. After the connection between the blocking beam 111 and the battery compartment 100 is completed, the tooling exits.

When the blocking beam 111 is placed in the second predetermined position, a preload force may be applied to the batteries. Application of the preload force may be implemented as follows: the blocking beam 111 is moved to the second predetermined position by the tooling, and the preload force is applied to the batteries. The tooling may push the blocking beam 111 along the first guiding structure and the second guiding structure and pushes the blocking beam 111 to the second predetermined position. When the blocking beam 111 is located at the predetermined position, the predetermined preload force is applied to the batteries. Certainly, in practical applications, the blocking beam 111 may be placed at the second predetermined position through other methods, such as a manual installation method, which is not limited by the embodiments of the disclosure.

In order to improve the strength of connection between the blocking beam 111 and the side walls 110 and the bottom plate 130, the assembly process of the battery pack provided by the embodiments of the disclosure may further include the following steps.

Glue is injected into the glue containers on the blocking beam 111 through the glue injecting holes. The glue containers are disposed at positions where the blocking beam 111 contacts the bottom plate 130 and/or the side walls 110. The glue injecting holes are disposed on the blocking beam 111, and the glue injecting holes communicate with the glue containers.

Glue is injected into the glue containers on the blocking beam 111 through the glue injecting holes to form the connecting glue layers in the glue containers. The blocking beam 111 is connected to the side walls 110 and the bottom plate 130 through the connecting glue layers, and in this way, the strength of connection of the blocking beam 111 is improved, and service life of the battery pack is thereby increased.

Glue may be injected between the battery compartment 100 and the battery module to form a connecting glue layer between the blocking beam 111 and the battery pack. The connecting glue layer may cover the large surfaces of the batteries close to the blocking beam 111. Connecting glue layers are formed between the sidewalls 110 and the battery pack.

The explosion-proof valve 150 may be mounted in the explosion-proof valve mounting hole 141 on the border frame 140. The explosion-proof valve 150 may be connected to the mounting hole by means of bolting, welding, riveting, or gluing.

Note that the battery pack provided by the disclosure may be assembled through the aforementioned assembly process.

In the assembly process of the battery pack provided by the embodiments of the disclosure, when the batteries are assembled, at least two adjacent side walls 110 of the battery compartment 100 excluding the blocking beam 111 are arranged at the first predetermined position to form the accommodating space 120. The batteries are then disposed in the accommodating space 120, the blocking beam 111 is disposed at the second predetermined position to limit the batteries, and assembly convenience of the batteries is thereby improved.

The exemplary embodiments of the disclosure further provide a vehicle. The vehicle includes the foregoing battery pack, and electric energy is provided to the vehicle through the battery pack.

Note that the battery pack and the assembly process of the battery pack in the vehicle are described in detail in the abovementioned embodiments, and description thereof is not specifically limited by the embodiments of the disclosure.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. An assembly process of a battery pack, wherein the battery pack comprises a battery compartment configured for accommodating a plurality of batteries, the battery compartment includes a bottom plate, a side wall of the battery compartment is a blocking beam, and the assembly process comprises:
   arranging at least two adjacent side walls of the battery compartment excluding the blocking beam at a first predetermined position to form an accommodating space;
   arranging the batteries in the accommodating space in an arranging direction perpendicular to an extending direction of the blocking beam;
   arranging sliding grooves or sliding rails on a top surface of the bottom plate, and arranging corresponding sliding rails or corresponding sliding grooves on a bottom surface of the blocking beam to guide the blocking beam to move in the arranging direction;
   arranging the blocking beam at a second predetermined position to limit the batteries; and
   connecting the blocking beam to the bottom plate of the battery compartment.

2. The assembly process according to claim 1, further comprising:
   providing a buffer layer between adjacent batteries.

3. The assembly process according to claim 2, further comprising:
   connecting the buffer layer to a surface of the batteries opposite to the buffer layer through gluing.

4. The assembly process according to claim 1, further comprising:
   connecting the blocking beam to a side wall of the battery compartment adjacent to the blocking beam.

5. The assembly process according to claim 2, further comprising:
   connecting the blocking beam to a side wall of the battery compartment adjacent to the blocking beam.

6. The assembly process according to claim 3, further comprising:
   connecting the blocking beam to a side wall of the battery compartment adjacent to the blocking beam.

7. The assembly process according to claim 4, wherein the step of connecting the blocking beam to the side wall of the battery compartment adjacent to the blocking beam further comprises:
   connecting the blocking beam to the side wall of the battery compartment adjacent to the blocking beam through one or more of gluing, bolting, and welding.

8. The assembly process according to claim 5, wherein the step of connecting the blocking beam to the side wall of the battery compartment adjacent to the blocking beam further comprises:
   connecting the blocking beam to the side wall of the battery compartment adjacent to the blocking beam through one or more of gluing, bolting, and welding.

9. The assembly process according to claim 6, wherein the step of connecting the blocking beam to the side wall of the battery compartment adjacent to the blocking beam further comprises:
   connecting the blocking beam to the side wall of the battery compartment adjacent to the blocking beam through one or more of gluing, bolting, and welding.

10. The assembly process according to claim 4, wherein the step of connecting the blocking beam to the bottom plate of the battery compartment further comprises:
    connecting the blocking beam to the bottom plate of the battery compartment through one or more of gluing, bolting, and welding.

11. The assembly process according to claim 5, wherein the step of connecting the blocking beam to the bottom plate of the battery compartment further comprises:
    connecting the blocking beam to the bottom plate of the battery compartment through one or more of gluing, bolting, and welding.

12. The assembly process according to claim 6, wherein the step of connecting the blocking beam to the bottom plate of the battery compartment further comprises:
    connecting the blocking beam to the bottom plate of the battery compartment through one or more of gluing, bolting, and welding.

13. The assembly process according to claim 1, wherein a border frame surrounding the side walls of the battery compartment is provided outside the battery compartment, an explosion-proof valve mounting hole is disposed at a corresponding position of the border frame and the blocking beam, and the step of arranging the blocking beam at the second predetermined position to limit the batteries further comprises:
    extending tooling into the explosion-proof valve mounting hole and moving the blocking beam to the second predetermined position to limit the batteries and set the batteries to be disposed in the battery compartment.

14. A battery pack, made through the assembly process according to claim 1.

15. A vehicle, comprising the battery pack according to claim 14.

* * * * *